(12) United States Patent
Lockhart

(10) Patent No.: US 7,320,230 B2
(45) Date of Patent: Jan. 22, 2008

(54) PUSHOUT MECHANISM FOR I.S. MACHINE

(75) Inventor: Robert J. Lockhart, Middletown, CT (US)

(73) Assignee: Emhart Glass SA, Cham (CH)

( * ) Notice: Subject to any disclaimer, the term of this patent is extended or adjusted under 35 U.S.C. 154(b) by 114 days.

(21) Appl. No.: 11/269,481

(22) Filed: Nov. 7, 2005

(65) Prior Publication Data

US 2007/0101767 A1 May 10, 2007

(51) Int. Cl.
*C03B 9/44* (2006.01)
(52) U.S. Cl. .............. 65/260; 65/239; 198/468.01
(58) Field of Classification Search ............ 65/165, 65/260, 330, 239, 241; 198/468.01, 469.1
See application file for complete search history.

(56) References Cited

U.S. PATENT DOCUMENTS 4,613,353 A * 9/1986 Voisine .................. 65/163
4,927,444 A * 5/1990 Voisine .................. 653/323
5,125,499 A * 6/1992 Saathoff et al. ......... 198/468.01
5,429,651 A * 7/1995 Bolin ................... 65/241
5,527,372 A * 6/1996 Voisine et al. ............ 65/260
5,733,354 A * 3/1998 Voisine et al. ............ 65/260
5,814,120 A * 9/1998 Lloyd et al. .............. 65/260
5,988,355 A * 11/1999 Merour .................. 198/493
6,269,662 B1 * 8/2001 Pinkerton et al. .......... 65/161
6,349,571 B1 * 2/2002 Gorski et al. ............. 65/260
6,494,063 B1 * 12/2002 Malek ................... 65/260
6,601,410 B1 * 8/2003 Bogert et al. ............. 65/260

* cited by examiner

*Primary Examiner*—Steven P. Griffin
*Assistant Examiner*—DeMaris R. Wilson
(74) *Attorney, Agent, or Firm*—Spencer T. Smith

(57) ABSTRACT

A pushout mechanism includes a pusher finger assembly which utilizes air jets to facilitate the location of bottles with the pockets defined by the fingers. The air jets are defined by in a projecting post in an orifice member which can be quickly released from the arm of the finger. The location of the air jet can, accordingly, be quickly adjusted by substituting an orifice member having a shorter or longer post.

3 Claims, 2 Drawing Sheets

PUSHOUT MECHANISM FOR I.S. MACHINE

The present invention relates to I.S. machines which produce glass bottles and, more particularly, to a pushout mechanism used in these machines.

BACKGROUND OF THE INVENTION

I.S. machines have a number of identical sections which produce bottles from discrete gobs of glass. Bottles formed in a section are deposited on a deadplate where they are cooled for a short period of time and then displaced by a pushout mechanism through a 90-degree arc onto a conveyor. U.S. Pat. No. 5,527,372, discloses a state of the art pusher which is part of a pushout mechanism. Other pushers are disclosed in U.S. Pat. Nos. 5,988,355 and 6,494,063. These patents teach the use of compressed air via directed air jets to enhance control of bottles by the pusher.

OBJECTS OF THE INVENTION

It is an object of the present invention to provide a pushout mechanism which has a quick-change orifice member so that desired positional adjustments will be facilitated.

Other objects and advantages of the present invention will become apparent from the following portion of this specification and from the accompanying drawings, which illustrate a presently preferred embodiment incorporating the principles of the invention.

BRIEF DESCRIPTION OF THE PREFERRED EMBODIMENT

Figure 1:
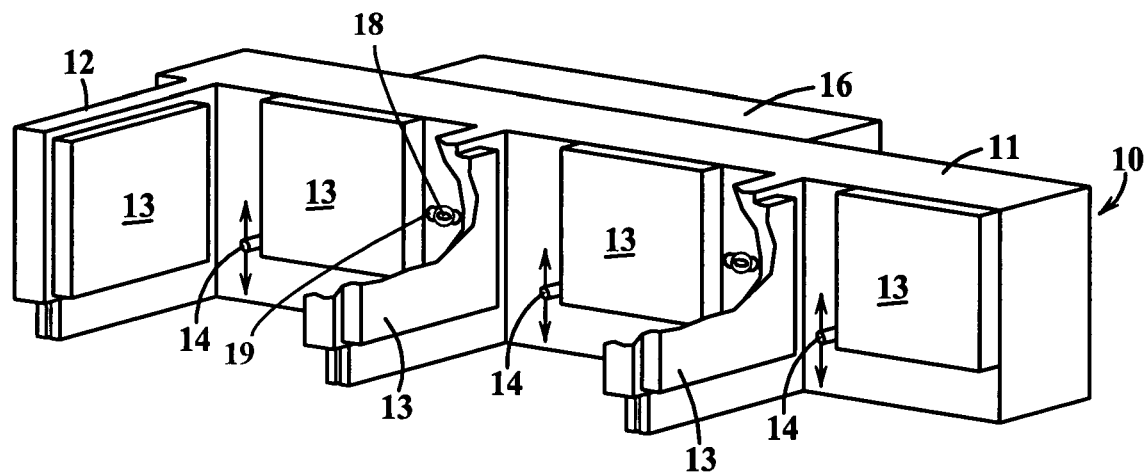
FIG. 1 is a front oblique view of the finger assembly portion of a pushout for an I.S. machine.

A pushout mechanism includes a finger assembly 10 which has an arm 11 and a plurality of perpendicularly related fingers 12 connected to the arm to define pockets (three) into which formed bottles will be deposited. While the finger assembly is illustrated with three pockets, the number of pockets depends on the size of the bottle being produced and small bottles may be produced quad gob and the finger assembly would have four pockets. These fingers may be integral with the arm as shown or releaseably connected to the arm and the fingers may have graphite pads 13 to engage the bottles. A bottle deposited into a pocket will be pulled into its corner by compressed air jetting from a nozzle 14. The arm 11 is connected to a pushout bracket 16 via suitable screws 18 which are located in elongated slots 19 and the bracket is secured to the pushout displacement mechanism (not shown) which will rotate the finger assembly through a prescribed path.

Figure 2:
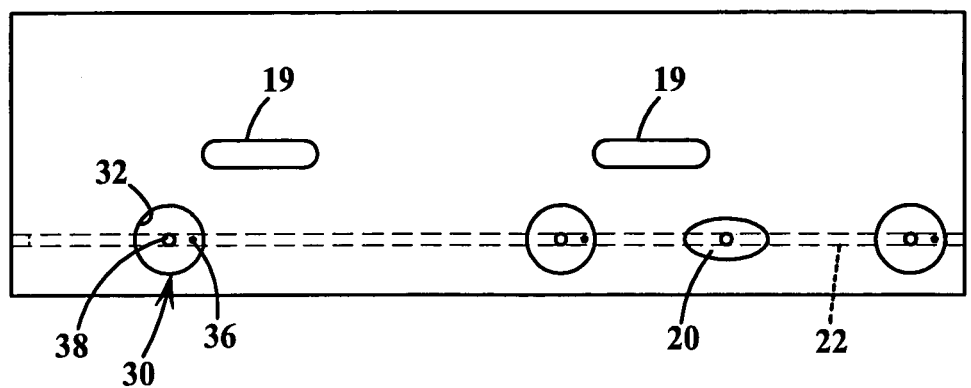
FIG. 2 is rear elevational view of the arm of the finger assembly portion shown in FIG. 1.
Figure 3:
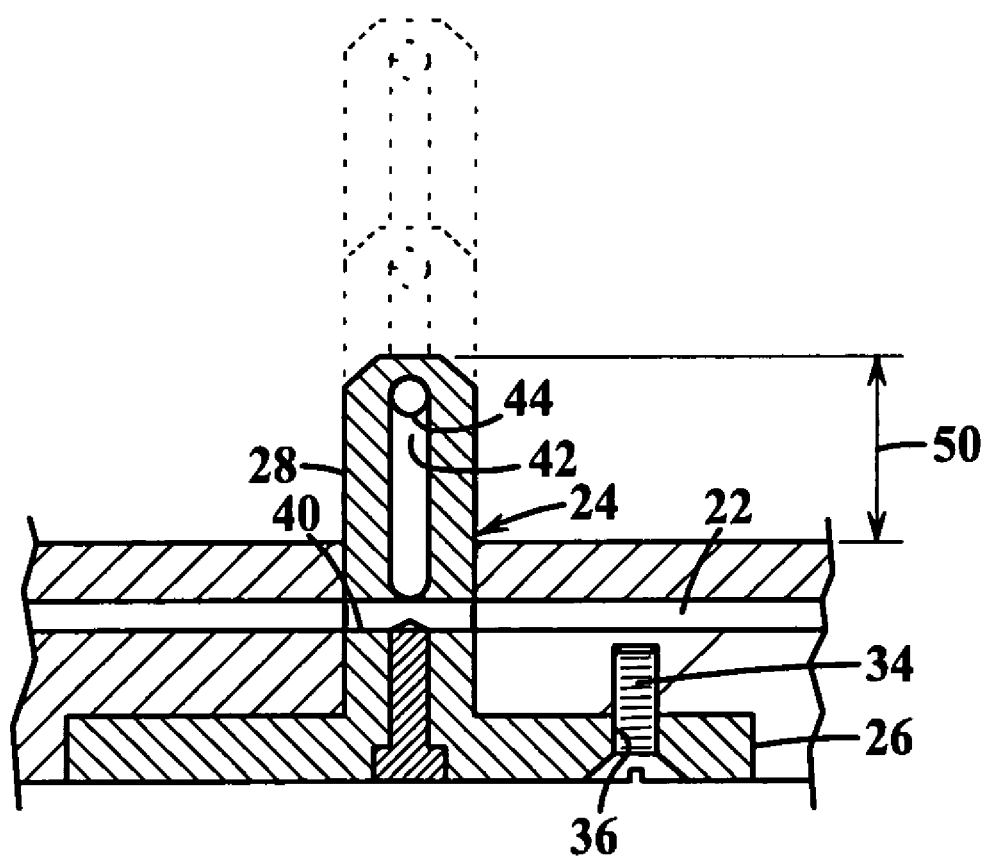
FIG. 3 is a side cross sectional view of one of the orifice members which are secured to the arm shown in FIG. 3.

FIG. 2 shows the back side of the arm 11 prior to assembly. An air inlet 20 which receives air from a supply line (not shown) in the pushout bracket 16, communicates with a cross conduit 22 in the arm. An orifice member 24 (FIG. 3) has a cylindrical head 26 and a projecting post 28. The cylindrical head 26 of the orifice member fits into a cylindrical cavity 32, which has a matching size and shape and is releasably fastened in place with a fastening screw 34 entering a threaded hole 36 in the arm. The screw orients the orifice member. The post 28 extends through the bore 38. A cross bore 40 in the orifice member communicates with the arm cross bore 22 to supply air to the post axial bore 42 which supplies an outlet bore or jet 44. In the illustrated embodiment the bore exhausts both upwardly and downwardly. The distance the post portion projects from the bracket is represented by the distance 50. As shown this orifice can be easily removed and replaced with an orifice member having a longer or shorter post so that the location of the air jet can be readily adjusted. As shown, the tip of the post is chamfered to enable the jet to be located as close to a located bottle as desired.

What is claimed is:

1. A pushout mechanism for an I.S. machine comprising a pusher finger assembly including
    an arm for supporting at least one finger,
    the arm having
        a front face which, with each of said fingers, defines a pocket for receiving a formed bottle, each pocket having a corner,
        a back surface,
        a cavity defined in said back surface for each pocket,
        a through hole extending from each cavity to the front face at a pocket corner,
        an air line including an inlet port and an arm conduit connecting said inlet port to each of said through holes,
    an orifice member for each of said fingers having a base configured for insertion into a cavity and a post for insertion into the hole in the cavity ending at a location beyond the front face of the arm,
    said post including an air discharge line having a discharge port at the end thereof and an inlet port connecting said air discharge line with the arm conduit,
    means for releasably securing the base of each orifice member within a cavity.

2. A pushout mechanism for an I.S. machine according to claim 1, wherein said cavity is a cylindrical pocket.

3. A pushout mechanism for an I.S. machine according to claim 2, wherein said orifice member base is the size and shape of said cylindrical pocket.

* * * * *